Figure 1:
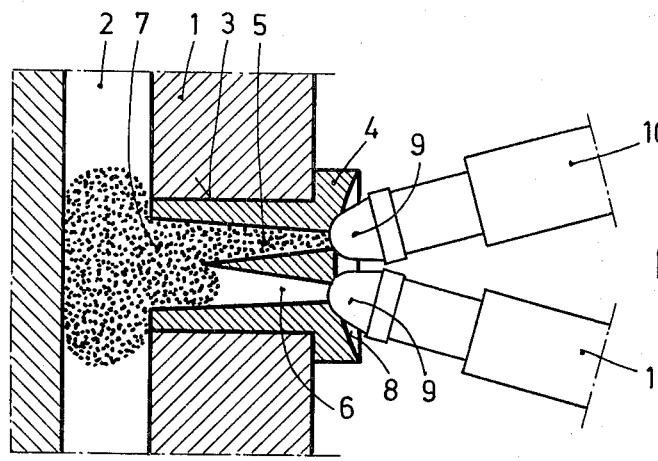

United States Patent [19]
Eckardt et al.

[11] 4,210,616
[45] Jul. 1, 1980

[54] APPARATUS FOR FORMING PLASTIC

[75] Inventors: Helmut Eckardt; Jürgen Ehritt, both of Hilchenbach-Allenbach, Fed. Rep. of Germany

[73] Assignee: Schloemann-Siemag AG., Düsseldorf, Fed. Rep. of Germany

[21] Appl. No.: 887,182

[22] Filed: Mar. 16, 1978

[30] Foreign Application Priority Data

Feb. 9, 1977 [DE] Fed. Rep. of Germany ....... 2705291

[51] Int. Cl.² .............. B29D 27/00; B29F 1/10
[52] U.S. Cl. .................... 264/45.1; 264/255; 264/328; 264/DIG. 83; 425/130; 425/573; 425/817 R
[58] Field of Search .............. 264/45.1, DIG. 83, 255, 264/328; 425/564, 572, 573, 567, 565, 569, 817 R, 130, 243

[56] References Cited

U.S. PATENT DOCUMENTS

| | | | |
|---|---|---|---|
| 2,226,408 | 12/1940 | Nast | 425/573 X |
| 2,279,380 | 4/1942 | Reid | 425/567 X |
| 3,061,879 | 11/1962 | Montpeat | 425/573 X |
| 3,809,519 | 5/1974 | Garner | 425/564 |
| 3,945,535 | 3/1976 | Leiste et al. | 425/243 X |
| 3,945,784 | 3/1976 | Collins | 425/817 R X |
| 3,947,175 | 3/1976 | Melcher | 425/130 |
| 3,947,177 | 3/1976 | Eckardt | 425/130 |
| 3,972,664 | 8/1976 | Fillmann | 425/130 |
| 4,014,966 | 3/1977 | Hanning | 264/45.1 |
| 4,078,875 | 3/1978 | Eckardt | 425/817 R X |

FOREIGN PATENT DOCUMENTS 1542645  9/1968  France ................... 425/572

Primary Examiner—Philip Anderson
Attorney, Agent, or Firm—Norman S. Blodgett; Gerry A. Blodgett

[57] ABSTRACT

A method for injection molding a product having a non-cellular skin layer and a cellular core portion. The method involves successive or simultaneous injection of a non-foamable resin material and a foamable resin material through a sprue bushing having an injection channel connected to the mold cavity and a pair of fixed feed channels intersecting with the injection channel. The injection mold has a bore with a sprue bushing therein. The sprue bushing having an injection channel therein and intersecting with a pair of fixed feed channels. Injection units deliver the materials to the pair of fixed feed channels.

4 Claims, 3 Drawing Figures

APPARATUS FOR FORMING PLASTIC

The invention relates to a method for the manufacture of molded parts of thermoplastic plastics with a compact skin and a porous core, with which a compact plastics mass and a plastics mass containing an expanding agent are injected successively and/or simultaneously through a sprue bushing into the mold cavity of a molding tool, as well as to a device for carrying out this method.

There is a method known for the manufacture of molded parts of thermoplastic plastics with a compact skin and a porous core, in which first a certain amount of a compact plastics mass is injected through a sprue bushing into the mold cavity of a molding tool. This amount is so measured that it does not fill out the mold volume of the molding tool. Subsequently a plastics mass containing an expanding agent is injected through the same sprue bushing into the mold cavity, which penetrates into the prelaid compact plastics mass and expands this or, respectively, brings about that it comes to lie against the wall of the mold cavity. For an injection cycle are used two injection cylinders, taking up different plastics masses, which become successively operative through a change-over valve. With this method there occurs on the changing-over of the valve from the one to the other injection cylinder a change of the flow front rate, which can be recognized on the finished molded part as marking.

To eliminate these markings there has become known a method for the manufacture of such like molded parts with which already shortly before conclusion of the injection of the compact plastics mass there is fed the plastics mass containing an expanding agent, i.e., the two different plastics masses are already brought together in the injection nozzle. On this method it is viewed as detrimental that after conclusion of a complete injection cycle there is in the injection nozzle not only compact plastics mass, but also the plastics mass which contains an expanding agent, which is carried along by the compact plastics mass on the subsequent or next injection cycle and can impair the molded part.

There are further known devices for the manufacture of molded parts with a compact skin and a porous core which have an injection nozzle with at least two channels arranged concentrically to one another for the different plastics masses. The one channel displays hereby a circular cross section and is surrounded by at least one other channel or circular cross section. To each of these channels is assigned a separate closing element, adapted to the cross section of the channels. Suchlike devices render possible a continual passing over from compact plastics mass to expansion-agent-containing plastics mass. The different plastics masses can be injected either successively or simultaneously. These devices have however many sealing surfaces as well as many reroutings for the two strands of plastics through which these devices are especially costly in their manufacture.

The invention has therefore the task to provide a method for the manufacture of molded parts of thermoplastic plastics with a compact skin and porous core, which furnishes unobjectionable molded parts and yet requires no costly devices.

For solution of this task is proposed in accordance with the invention on a method of the over-concept that the compact plastics mass and the plastics mass containing an expanding agent flow through separate channels into the sprue bushing and come only in this in communication with one another, preferably near to its outlet side. Hereby is possible a successive as well as also a simultaneous injection of the two plastics masses. A device for carrying out the method of the invention as shown and described in the present application.

Figure 2:
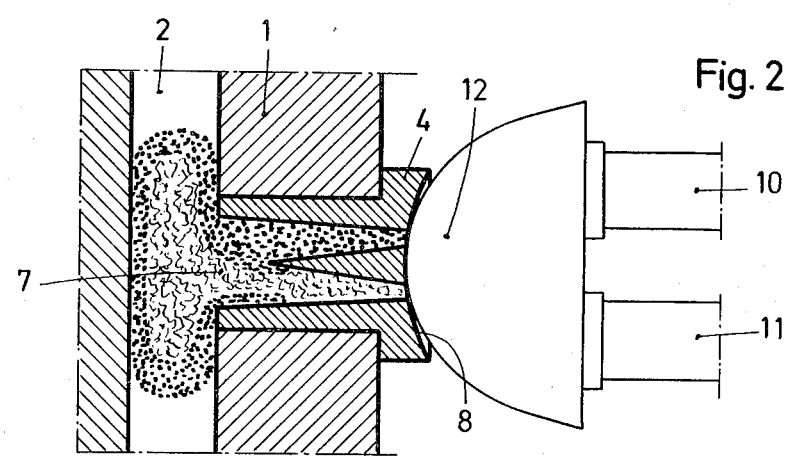
Figure 3:
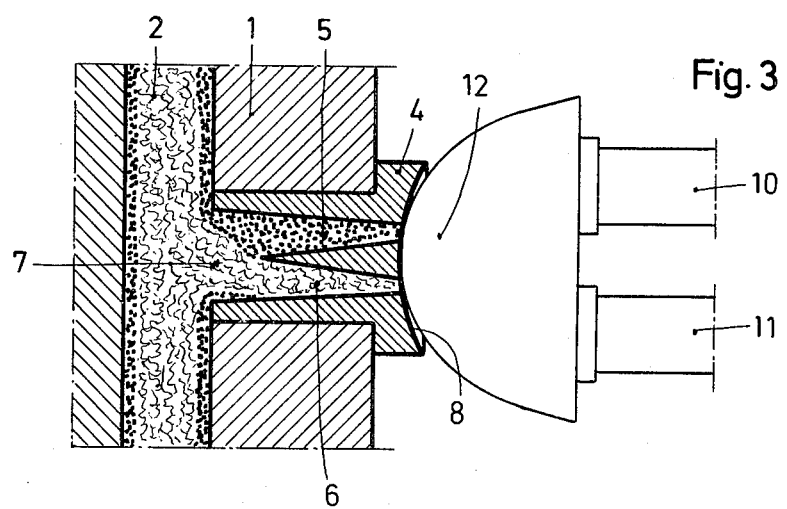

Additional features and advantages of the invention are explained hereunder in more detail with the aid of an exemplified embodiment represented in the drawing. Hereby show:

FIG. 1 a molding tool with sprue bushing where only a compact plastics mass is injected, FIG. 2 the molding tool of FIG. 1, where compact as well as expanding-agent-containing plastics mass is injected, and FIG. 3 the molding tool of FIGS. 1 and 2 where only the plastics mass containing an expanding agent is injected.

Of a device for the manufacture of molded parts of thermoplastic plastics with a compact skin and a porous core is illustrated in the drawing only one molding tool 1, which is constructed in per se known, undepicted manner in two parts as well as capable of being heated and/or cooled. The molding tool 1 has merely indicated molding cavity 2 the contour of which accurately corresponds to the shape of the molded part that is to be manufactured. From the mold cavity 2 extends to the outside a bore 3, into which is inserted a so-called sprue bushing 4.

This sprue bush 4 has at its end that faces away from the mold cavity 2 two inlet channels 5, 6, arranged at a distance from each other, which have circular cross section and conically enlarge in direction towards the mold cavity 2. This progressive enlargement brings about that the two inlet channels 5, 6 pass over at a distance before the mold cavity 2 into a common injection channel 7, likewise enlarging in direction towards the mold cavity 2.

The free front face 8 of the sprue bushing 4 is so designed that there can be brought to abut the nozzle heads 9 of two per se known injection units 10, 11 (FIG. 1) or a nozzle head connecting the two injection units 10, 11 with each other (FIGS. 2 and 3) in such a manner that the undepicted outlet channels of the injection units 10, 11 or of the nozzle heads 9, 12, respectively, pass over in the inlet channels 5, 6 of the sprue bushing 4. These outlet channels can hereby be separately closed through per se known closing elements.

In the illustrated exemplified embodiment the injection unit 10 delivers compact plastics mass, while the injection unit 11 conveys plastics mass which contains an expanding agent. In the manufacture of a molded part with compact skin and porous core is first opened the outlet channel of the injection unit 10 so that compact plastics mass flows through the inlet channel 5 and the injection channel 7 into the mold cavity 2 (FIG. 1). This compact plastics mass penetrates only slightly into the inlet channel 6. As soon as a given amount of compact plastics mass is in the mold cavity 2, is additionally also freed the outlet channel of the injection unit 11, so that now plastics mass containing an expanding agent reaches the mold cavity 2 through the inlet channel 6 and the injection channel 7 (FIG. 2).

The plastics mass containing an expanding agent has hereby always the tendency to reach the warmer zone, that is, the interior of the compact plastics mass. As soon as an amount of compact plastics mass sufficient for the formation of the molded part is located in the mold cavity 2, the outlet channel of the injection unit 10 is closed and the in-flow of compact plastics mass into the mold cavity 2 is terminated. The plastics mass containing an expanding agent foams up in the mold nest and presses through this the compact plastics mass to the wall of the mold cavity 2. As soon as there is located in the mold cavity 2 an amount of plastics mass containing an expanding agent that is sufficient for the foaming process, also the feeding of this plastics mass is interrupted. When the plastics mass injected into the mold cavity 2 has cooled to a great degree and is sufficiently firm, the mold 1 is opened and the finished molded part is removed together with the sprue, that is, the material which is in the inlet channels 5, 6 and the injection channel 7. The removal process is facilitated through the conical shape of the inlet channels 5, 6 and of the injection channel 7.

In dependence on the plastics masses that are to be processed and the shape of the molded parts it is possible to alter the cross section and the angle of the inlet channels 5, 6 individually or jointly. This means that e.g. the inlet channel 5 can be considerably larger than the inlet channel 6. Furthermore it is possible to shift the point at which the two different plastics masses come into communication or contact, respectively, in direction towards the mold cavity 2. The limiting case is to be seen in that the two plastics masses come together only in the mold cavity 2.

We claim:

1. Method of manufacturing molded parts of thermoplastic material with a compact skin and a porous core in a mold having a cavity, an injection channel connected to the cavity and a pair of fixed inlet channels extending from outer openings in the mold and intersecting within the injection channel at a point spaced from the cavity, said method comprising:
   (a) injecting a first plastic mass into one of said openings until it partially fills the cavity, and
   (b) injecting a second plastic mass containing a foaming agent into the other of said outer openings so that the second plastic merges with the first plastic mass in the injection channel and thereafter fills the entire mold cavity together with the first plastic mass.

2. Device for the manufacture of molded parts of thermoplastic material with a compact skin and a porous core, said device comprising:
   (a) an injection mold having an interior mold cavity and a bore extending from the mold cavity to the outside of the mold, and
   (b) a sprue bushing within the bore and having an injection channel connected to the mold cavity, a pair of outer openings, and a pair of fixed channels extending from the pair of outer openings and intersecting within the injection channel at a point spaced from the mold cavity.

3. Device as recited in claim 2 wherein the inlet channels are conical with the small ends at said outer openings and the larger ends at the injection channel.

4. Device as recited in claim 2, comprising:
   (a) means for injecting a plastic mass into one of said outer openings, and
   (b) means for injecting a plastic mass containing a foaming agent into the other of said outer openings.

* * * * *